United States Patent
Suk

(10) Patent No.: US 12,069,373 B2
(45) Date of Patent: Aug. 20, 2024

(54) APPARATUS AND METHOD FOR DETECTING TARGET BY INTERLOCKING TARGET IN MONITORING SYSTEM

(71) Applicant: HANWHA AEROSPACE CO., LTD., Changwon-si (KR)

(72) Inventor: Bong Kyung Suk, Changwon-si (KR)

(73) Assignee: HANWHA AEROSPACE CO., LTD., Changwon-si (KR)

( * ) Notice: Subject to any disclaimer, the term of this patent is extended or adjusted under 35 U.S.C. 154(b) by 286 days.

(21) Appl. No.: 17/737,538

(22) Filed: May 5, 2022

(65) Prior Publication Data

US 2023/0117121 A1    Apr. 20, 2023

(30) Foreign Application Priority Data

Oct. 15, 2021    (KR) .................. 10-2021-0137819

(51) Int. Cl.
*H04N 23/695* (2023.01)
*H04N 7/18* (2006.01)

(52) U.S. Cl.
CPC ............ *H04N 23/695* (2023.01); *H04N 7/18* (2013.01)

(58) Field of Classification Search
None
See application file for complete search history.

(56) References Cited

U.S. PATENT DOCUMENTS

| | | | | |
|---|---|---|---|---|
| 6,130,705 A | * | 10/2000 | Lareau | H04N 23/6811 |
| | | | | 382/106 |
| 9,773,420 B2 | * | 9/2017 | Ohtomo | G05D 1/0011 |
| 11,216,663 B1 | * | 1/2022 | Ettinger | G05D 1/0016 |
| 2008/0273210 A1 | * | 11/2008 | Hilde | G01S 7/4802 |
| | | | | 356/601 |
| 2009/0324010 A1 | * | 12/2009 | Hou | G06V 20/52 |
| | | | | 382/103 |
| 2010/0157056 A1 | * | 6/2010 | Zohar | G01S 13/66 |
| | | | | 348/148 |
| 2016/0344981 A1 | * | 11/2016 | Lunt | G01P 3/38 |
| 2019/0049545 A1 | * | 2/2019 | Anderson | G01S 17/04 |
| 2019/0178436 A1 | * | 6/2019 | Mao | H04N 23/68 |
| 2021/0009266 A1 | * | 1/2021 | Lee | G05D 1/101 |
| 2021/0326608 A1 | * | 10/2021 | Yoshimi | G06V 20/58 |
| 2021/0350572 A1 | * | 11/2021 | Wang | G06T 7/20 |

FOREIGN PATENT DOCUMENTS

| | | |
|---|---|---|
| KR | 10-1485991 B1 | 1/2015 |
| KR | 10-1494775 B1 | 2/2015 |
| KR | 10-1759610 B1 | 7/2017 |

* cited by examiner

*Primary Examiner* — Stefan Gadomski
(74) *Attorney, Agent, or Firm* — Sughrue Mion, PLLC

(57) ABSTRACT

Provided is a monitoring system including: a monitoring apparatus configured to monitor a target; and an operating apparatus configured to operate the monitoring apparatus. In the monitoring system, the operating system includes a controller, and the controller is configured to obtain target information from an outside; receive monitoring information from the monitoring apparatus; determine driving information for driving the monitoring apparatus so that the target is positioned in a monitoring area of the monitoring apparatus, based on the target information and the monitoring information; determine an interlocking field of view (FOV) for adjusting the monitoring area on the basis of the driving information; and transmit the interlocking FOV and a driving angle based on the driving information, to the monitoring apparatus.

20 Claims, 9 Drawing Sheets

APPARATUS AND METHOD FOR DETECTING TARGET BY INTERLOCKING TARGET IN MONITORING SYSTEM

CROSS-REFERENCE TO THE RELATED APPLICATION

This application is based on and claims priority from Korean Patent Application No. 10-2021-0137819, filed on Oct. 15, 2021, in the Korean Intellectual Property Office, the disclosure of which is incorporated by reference herein in its entirety.

BACKGROUND

1. Field

One or more embodiments relate generally to a method of controlling a monitoring apparatus and an operating apparatus in a monitoring system, and more particularly, to an apparatus and method for automatically detecting a target by interlocking a monitoring area of a monitoring apparatus and a target position in a monitoring system.

2. Description of the Related Art

A monitoring system refers to a system that monitors, detects, and tracks a target by using a monitoring apparatus. In particular, the monitoring apparatus may be mounted on a moving object to perform a task, and as the monitoring apparatus continuously moves with the moving object, a separate apparatus for controlling the monitoring apparatus is needed. Accordingly, a monitoring system using a monitoring apparatus mounted on the moving object may include a monitoring apparatus that directly detects and tracks a target, and an operating apparatus that controls overall operations of the monitoring apparatus from the outside of the monitoring apparatus, such as, point direction adjustment of a monitoring sensor of the monitoring apparatus, and movement.

According to the related art, in a monitoring system, an operating apparatus receives target coordinates corresponding to an earth center of coordinates of a target from a user, or obtains a signal indicating separate target coordinates. Thereafter, the operating apparatus performs various coordinate transformations by using coordinates of a monitoring apparatus from a satellite, an inertial navigation sensor, an inclinometer, or the like mounted on the monitoring apparatus, and inclination information related to a direction a monitoring sensor is pointing. Accordingly, a turning angle and a height angle are calculated for interlocking a monitoring area using the monitoring sensor of the monitoring apparatus and a target position, and the calculated turning angle and height angle are transmitted to the monitoring apparatus. The monitoring apparatus receives the turning angle and the height angle from the operating apparatus, and adjusts the turning angle and the height angle by using a turning driving body and a height driving body, and thus detects a target through the monitoring sensor, such as a visible light camera, and an infrared camera image of the monitoring apparatus.

Satellites, inertial navigation sensors, inclinometers, or the like are used to obtain or interlock target coordinates generate measurement errors in an operation of obtaining target coordinates, and the degree of measurement errors varies depending on a type of monitoring sensor. According to an example, in a case of a global positioning system (GPS) sensor measuring latitude, longitude, and altitude, a measurement error of several meters (m) to several tens of meters may occur, and in a case of an inertial navigation sensor or an inclinometer for measuring a heading angle, a pitch angle, and a roll angle, a measurement error of several milliradians (mrad) to several tens of milliradians may occur. In addition, a distance between a target and the monitoring apparatus has various values between several hundred meters and several thousand meters, a monitoring sensor in the related art uses continuous zoom or step-by-step zoom having a variable field of view (FOV) of several degrees (°) to several tens of degrees, and thus, the FOV of a monitoring camera for observing a target may also have various values. Due to these measurement errors and the diversity of the target distance, calculated values of a turning angle and a height angle for interlocking a monitoring area and a target position may have a large difference from the true values, and accordingly, the position of the target may not be positioned in the center of an image of a monitoring sensor after interlocking. Also, when an FOV set in the monitoring sensor is not greater than a driving accuracy of the monitoring apparatus, the target may disappear from the image of the monitoring camera.

That is, according to the related art, an operating apparatus may not accurately determine a driving angle and an interlocking FOV of a monitoring apparatus due to a sensor error generated in a measuring operation, and a target position is difficult to deal with when it is not interlocked with a monitoring area of the monitoring apparatus. In response, development of a technology for increasing the accuracy of interlocking between a monitoring area of a monitoring apparatus and a target position is required.

The above-described technology is technical information that the inventor possessed for the derivation of embodiments of the present disclosure or acquired during the derivation of embodiments of the present disclosure, and does not necessarily indicate known technology disclosed to the general public prior to the filing of the present disclosure.

SUMMARY

Based on the above discussion, embodiments of the present disclosure provide an apparatus and method for automatically detecting a target by interlocking a monitoring area of a monitoring apparatus and a position of the target in a monitoring system.

In addition, embodiments of the present disclosure provide an apparatus and method for, in a monitoring system, an operating apparatus to accurately determine a driving angle and an interlocking field of view (FOV) of a monitoring apparatus by considering measurement errors.

In addition, embodiments of the present disclosure provide an apparatus and method for a monitoring apparatus to track and monitor a target by using re-driving when a monitoring area and a position of the target are not interlocked.

Additional aspects will be set forth in part in the description which follows and, in part, will be apparent from the description, or may be learned by practice of the presented embodiments of the present disclosure.

According to embodiments of the present disclosure, an operating apparatus is provided that is configured to control a monitoring apparatus that is mounted on a moving object, the monitoring apparatus including a monitoring camera and configured to a detect a target. The operating apparatus includes: a controller, wherein the controller is configured to: obtain target information from an outside; receive monitoring information from the monitoring apparatus; determine, based on the target information and the monitoring information, driving information for driving the monitoring apparatus so that the target is positioned in a monitoring area of a monitoring image of the monitoring camera of the monitoring apparatus; determine, based on the driving information, an interlocking field of view (FOV) for adjusting the monitoring area; and transmit the interlocking FOV and a driving angle, based on the driving information, to the monitoring apparatus.

According to one or more embodiments of the present disclosure, the target information includes target coordinates and a target shape, the monitoring information includes coordinates, inclination, and inclination accuracy of the monitoring apparatus, the inclination includes at least one from among a heading angle, a roll angle, and a pitch angle, and the inclination accuracy includes a sensor error of the monitoring camera of the monitoring apparatus.

According to one or more embodiments of the present disclosure, the driving information includes the driving angle, a driving accuracy, and a target distance, the driving angle includes information on a turning angle and a height angle related to driving of the monitoring apparatus, the driving accuracy includes a turning error with respect to the turning angle, and a height error with respect to the height angle, and the target distance includes a distance between the target and the monitoring apparatus.

According to one or more embodiments of the present disclosure, the controller is further configured to: determine the driving accuracy, based on the inclination accuracy and a preset error table, and determine the interlocking FOV, based on the driving accuracy and the target distance.

According to one or more embodiments of the present disclosure, the controller is further configured to: determine an initial interlocking FOV, based on the turning error and the height error, and determine the interlocking FOV from the initial interlocking FOV, based on an operation mode of the operating apparatus being a first detection mode or a second detection mode, wherein the first detection mode includes a mode in which the interlocking FOV is determined based on a required FOV for detection according to the target shape, and wherein the second detection mode includes a mode in which the interlocking FOV is determined based on a preset target position range value.

According to one or more embodiments of the present disclosure, the controller is further configured to: identify whether the turning error is greater than or equal to a mathematical combination of the height error and a ratio of a horizontal resolution to a vertical resolution of the monitoring apparatus, determine the turning error as the initial interlocking FOV based on the turning error being greater than or equal to the mathematical combination of the height error and the ratio, and determine the mathematical combination of the height error and the ratio as the initial interlocking FOV, based on the turning error being less than the mathematical combination of the height error and the ratio.

According to one or more embodiments of the present disclosure, the controller is further configured to: based on the operation mode being the first detection mode, determine an area size of the target, based on the target shape and preset area information, determine a number of detection pixels of the target, based on the target shape and preset pixel number information, determine the required FOV for detection, based on the area size, the number of detection pixels, the target distance, and a horizontal resolution of the monitoring camera of the monitoring apparatus, and determine the interlocking FOV, based on the required FOV for detection and the initial interlocking FOV.

According to embodiments of the present disclosure, a monitoring apparatus is provided that is mounted on a moving object and configured to detect a target. The monitoring apparatus includes: a monitoring camera; and a controller, wherein the controller is configured to: transmit monitoring information to an operating apparatus that includes a controller, receive a driving angle and an interlocking field of view (FOV) from the operating apparatus, adjust a pointing direction of the monitoring camera, based on the driving angle, and adjust an FOV of the monitoring camera, based on the interlocking FOV, wherein the driving angle includes information for driving the monitoring apparatus so that the target is positioned in a monitoring area of a monitoring image of the monitoring camera, and wherein the interlocking FOV includes an FOV for adjusting the monitoring area.

According to one or more embodiments of the present disclosure, the controller is further configured to: identify whether the target is positioned in the monitoring area of the monitoring image, and perform re-driving to track the target based on the controller identifying that the target is not positioned in the monitoring area, the re-driving including re-adjusting the pointing direction of the monitoring camera.

According to one or more embodiments of the present disclosure, the controller is further configured to, based on determining that there is no time period in which the target is positioned in the monitoring area, adjust the pointing direction of the monitoring camera based on at least one preset driving pattern.

According to one or more embodiments of the present disclosure, the controller is further configured to, based on determining that there is a time period in which the target is positioned in the monitoring area: determine a first target position of the target in the monitoring area at a first time, determine a second target position of the target in the monitoring area at a second time after the first time, predict a position of the target based on the first target position, the second target position, and a time interval between the first time and the second time, and adjust the pointing direction of the monitoring camera to a predicted target direction.

According to embodiments of the present disclosure, a monitoring system is provided. The monitoring system includes: an operating apparatus including a controller; and a monitoring apparatus including a controller and a monitoring camera. The operating apparatus is configured to: obtain target information from an outside; receive monitoring information from the monitoring apparatus; determine, based on the target information and the monitoring information, driving information for driving the monitoring apparatus so that a target is positioned in a monitoring area of a monitoring image of the monitoring camera; determine, based on the driving information, an interlocking field of view (FOV) for adjusting the monitoring area; and transmit the interlocking FOV and a driving angle, based on the driving information, to the monitoring apparatus. The monitoring apparatus is configured to: transmit the monitoring information to the operating apparatus, receive the driving angle and the interlocking FOV from the operating apparatus; adjust, based on the driving angle, a pointing direction of the monitoring camera of the monitoring apparatus; and adjust, based on the interlocking FOV, an FOV of the monitoring camera.

According to embodiments of the present disclosure, a method performed by at least one controller of a monitoring system is provided. The at least one controller includes at least one processor. The method includes: obtaining target information; obtaining monitoring information; determining, based on the target information and the monitoring information, driving information for driving a monitoring apparatus of the monitoring system so that a target is positioned in a monitoring area of a monitoring image of a monitoring camera of the monitoring apparatus; determining, based on the driving information, an interlocking field of view (FOV) for adjusting the monitoring area; obtaining a driving angle based on the driving information; adjusting, based on the driving angle, a pointing direction of the monitoring camera of the monitoring apparatus; and adjusting, based on the interlocking FOV, an FOV of the monitoring camera.

According to one or more embodiments of the present disclosure, the target information includes target coordinates and a target shape, the monitoring information includes coordinates, inclination, and inclination accuracy of the monitoring apparatus, the inclination includes at least one from among a heading angle, a roll angle, and a pitch angle, and the inclination accuracy includes a sensor error of the monitoring camera of the monitoring apparatus.

According to one or more embodiments of the present disclosure, the driving information includes the driving angle, a driving accuracy, and a target distance, the driving angle includes information on a turning angle and a height angle related to driving of the monitoring apparatus, the driving accuracy includes a turning error with respect to the turning angle, and a height error with respect to the height angle, and the target distance includes a distance between the target and the monitoring apparatus.

According to one or more embodiments of the present disclosure, the method further includes: determining the driving accuracy, based on an inclination accuracy, included in the monitoring information, and a preset error table, and determining the interlocking FOV, based on the driving accuracy and the target distance.

According to one or more embodiments of the present disclosure, the method further includes: determining an initial interlocking FOV based on the turning error and the height error, and determining the interlocking FOV based on the initial interlocking FOV.

According to one or more embodiments of the present disclosure, the determining the interlocking FOV includes: determining a required FOV for detection based on a target shape included in the target information; determining the interlocking FOV based on the required FOV for detection and the initial interlocking FOV.

According to one or more embodiments of the present disclosure, the determining the interlocking FOV includes determining the interlocking FOV based on the initial interlocking FOV and a preset target position range value.

According to one or more embodiments of the present disclosure, the method further includes: identifying whether the target is positioned in the monitoring area of the monitoring image, and performing re-driving to track the target based on identifying that the target is not positioned in the monitoring area, the performing the re-driving including re-adjusting the pointing direction of the monitoring camera.

Various respective aspects and features of the present disclosure are defined in the appended claims. Combinations of features of the dependent claims may be combined with features of the independent claims as appropriate, not just expressly set forth in the claims.

In addition, one or more features selected in any one embodiment described in the present disclosure may be combined with one or more features selected in any other embodiment described in the present disclosure, and alternative combinations of these features at least partially alleviate one or more technical problems discussed in the present disclosure, or at least partially alleviate a technical problem that may be discerned by one of the ordinary skill in the art from the present disclosure, and furthermore, the particular combinations or permutations thus formed of the embodiment features are possible, as long as they are not understood by one of ordinary skill in the art to be incompatible.

In any described example implementation, two or more physically separate components may alternatively be integrated into a single component if their integration is possible, and the integration is possible as long as the same function is performed by a single component thus formed. Additionally, a single component of any embodiment described in the present disclosure may alternatively be implemented with two or more separate components that achieve the same function, where appropriate.

Certain embodiments of the present disclosure at least partially solve, mitigate, or eliminate at least one of the problems and/or disadvantages associated with the related art. Certain embodiments aim to provide at least one of the advantages described below.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
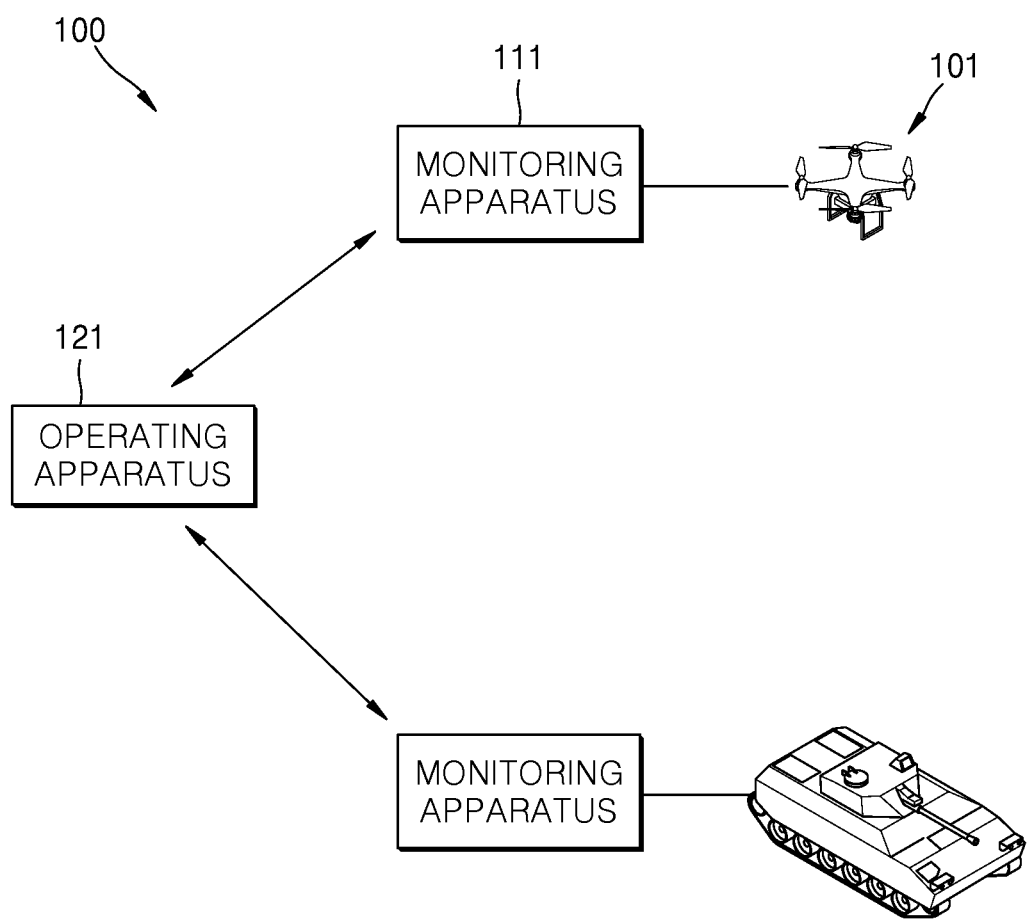
FIG. 1 shows a monitoring system according to various embodiments.

Reference will now be made in detail to embodiments, examples of which are illustrated in the accompanying drawings, wherein like reference numerals refer to like elements throughout. In this regard, the embodiments of the present disclosure may have different forms and should not be construed as being limited to the descriptions set forth herein. Accordingly, non-limiting example embodiments are described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

The terms used in the present disclosure are merely used to describe particular embodiments, and are not intended to limit the present disclosure. An expression used in the singular encompasses the expression of the plural, unless it has a clearly different meaning in the context. Terms used herein, including technical or scientific terms, may have the same meanings as commonly understood by one of ordinary skill in the art described in the present disclosure. Among the terms used in the present disclosure, terms defined in a general dictionary may be interpreted as the same or similar meaning to the meaning in the context of the related art, and unless explicitly defined in the present disclosure, the terms are not to be construed in an ideal or overly formal sense. In some cases, even terms defined in the present disclosure may not be construed to exclude embodiments of the present disclosure.

In various embodiments of the present disclosure described below, a hardware access method is described as an example. However, because various embodiments of the present disclosure include technology using both hardware and software, various embodiments of the present disclosure do not exclude a software-based approach.

Embodiments of the present disclosure relate to an apparatus and method for automatically detecting a target by interlocking a monitoring area of a monitoring apparatus and a target position in a monitoring system. In particular, embodiments of the present disclosure include a technique for increasing the accuracy of interlocking the monitoring area of the monitoring apparatus and the target position in the monitoring system.

Hereinafter, various embodiments are described in detail with reference to the accompanying drawings so that one of ordinary skill in the art to which the present disclosure pertains may easily implement embodiments of the present disclosure. However, because embodiments of the present disclosure may be modified and implemented in various forms, it is not limited to the embodiments described in the present disclosure. In the below description, when it is deemed that a detailed description of a related known technology may obscure the essence of the present disclosure, a detailed description of the known technology is omitted. The same or similar components are given the same reference numerals, and redundant descriptions thereof are omitted.

In the present disclosure, when an element is described as being "connected" with another element, a case where the elements are "directly connected" is included, and a case where the elements are "indirectly connected" with another element therebetween is also included. When an element "includes" another element, another element may be further included, rather than excluding the existence of the other element, unless otherwise described.

Some embodiments may be described in terms of functional block components and various processing steps. Such functional blocks may be realized by any number of hardware and/or software components configured to perform the specified functions. For example, the functional blocks of embodiments of the present disclosure may be implemented by one or more microprocessors, or may be implemented by circuit components for a given function. The functional blocks of embodiments of the present disclosure may be implemented in various programming or scripting languages. The functional blocks of embodiments of the present disclosure may be implemented as an algorithm being executed on one or more processors. A function performed by a functional block of the present disclosure may be performed by a plurality of functional blocks, or functions performed by a plurality of functional blocks in embodiments of the present disclosure may be performed by one functional block. In addition, embodiments of the present disclosure may employ the related art for electronic environment setting, signal processing, and/or data processing.

In addition, in the present disclosure, in order to determine whether a specific condition is satisfied or fulfilled, an expression of more than or less than is used, but this is only a description to express an example, and does not exclude the descriptions of more than or equal to, and less than or equal to. Conditions described as "more than or equal to" may be replaced with "more than," and vice versa. Conditions described as "less than or equal to" may be replaced with "less than," and vice versa.

FIG. 1 shows a monitoring system 100 according to various embodiments.

The monitoring system 100 instructs a system which collects various pieces of information by using a monitoring apparatus mounted on an artificial satellite, an unmanned aerial vehicle, a robot, or the like, and by using units such as an optical camera, an infrared camera, or radio waves like microwaves. Friendly forces may respond to risk components of enemy forces by using a monitoring system to secure a monitoring image related to a target. Referring to FIG. 1, recently, due to the diversification of weapon systems, a monitoring system in which a monitoring apparatus is mounted on a moving object to monitor a target, and a separate operating apparatus distinct from the monitoring apparatus controls an operation of the monitoring apparatus on the ground, has been widely used. Accordingly, the monitoring system 100 may include a moving object 101, a monitoring apparatus 111, and an operating apparatus 121.

The moving object 101 refers to a moving object that performs a mission of the friendly forces. The moving object 101 may be mounted with the monitoring apparatus 111 to perform a mission of monitoring a target, and may perform a function of moving the monitoring apparatus 111 to coordinates of a desired position. Referring to FIG. 1, although an unmanned aerial vehicle is described as the moving object 101, the moving object 101 may indicate any form of a movable robot such as a tank or other vehicles.

The monitoring apparatus 111 refers to an apparatus that is configured to perform a direct mission of detecting and monitoring a target. The monitoring apparatus 111 may be mounted on the moving object 101 and move together with the moving object 101. Here, mounting may include both an arrangement inside the moving object 101 and an arrangement of being attached to the outside of the moving object 101. The monitoring apparatus 111 may include a monitoring sensor such as a monitoring camera, and a driving body for adjusting an orientation direction of the monitoring sensor. The monitoring apparatus 111 may be mounted on the moving object 101 to move to a mission performance position, and perform a monitoring mission by driving the monitoring sensor to adjust to direct a direction of target coordinates. Hereinafter, a case in which the monitoring apparatus 111 is mounted on the moving object 101 and operates is described, but the monitoring apparatus 111 may be fixed on the ground to perform the same operation without being mounted on the moving object 101.

The operating apparatus 121 controls the monitoring apparatus 111 mounted on the moving object 101 and performs a function of generally operating the monitoring system 100. The operating apparatus 121 may be connected to the monitoring apparatus 111 by wire or wirelessly to share information with the monitoring apparatus 111. FIG. 1 illustrates a case in which the operating apparatus 121 is connected to two of monitoring apparatus 111, but the number of the monitoring apparatus 111 connected to the operating apparatus 121 may be freely changed according to embodiments. In addition, the operating apparatus 121 may receive information from the user and may be driven under the control of the user. The operating apparatus 121 may generate a signal for controlling a driving operation of the monitoring apparatus 111, based on information shared with the monitoring apparatus 111 and a user input. Thereafter, the operating apparatus 121 may transmit the generated control signal to the monitoring apparatus 111.

In the monitoring system 100, the operating apparatus 121 may obtain target coordinates by using a method of receiving a direct input from the user or a method of receiving a separate signal. According to an embodiment of the present disclosure, coordinates may include coordinates related to latitude, longitude, and altitude. Then, the operating apparatus 121 may determine a field of view (FOV) for adjusting a driving angle and a monitoring area of the monitoring apparatus 111 to position a target in a monitoring image using the monitoring apparatus 111. The monitoring apparatus 111 may monitor a target by receiving a driving angle and an interlocking FOV determined by the operating apparatus 121, and driving the monitoring apparatus 111 to correspond to the driving angle and the interlocking FOV.

Figure 2:
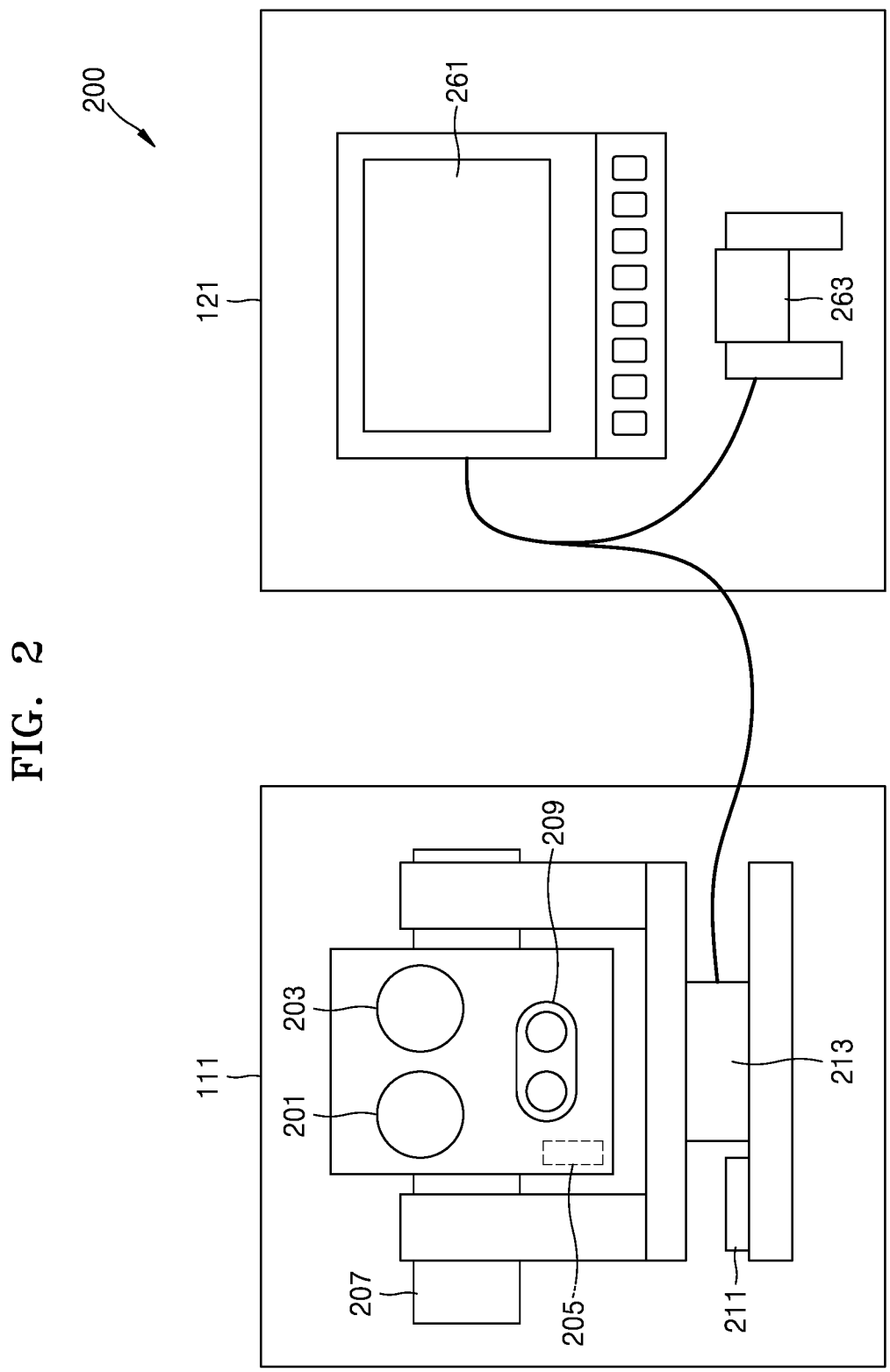
FIG. 2 shows a configuration of a monitoring apparatus and an operating apparatus in a monitoring system, according to various embodiments.

FIG. 2 shows a configuration 200 of a monitoring apparatus and an operating apparatus in the monitoring system 100, according to various embodiments. " . . . unit", "-er", or the like used hereinafter refers to a unit that processes at least one function or operation, which may be implemented as hardware or software, or a combination of hardware and software. Referring to FIG. 2, the monitoring system 100 includes the monitoring apparatus 111 mounted on the moving object 101, and an operating apparatus 121 for operating the monitoring apparatus 111.

The monitoring apparatus 111 performs a function of monitoring a target by using a monitoring sensor. According to an embodiment of the present disclosure, the monitoring apparatus 111 may include at least one camera 210 and 203 configured to capture an image of a visible light area or infrared area with respect to a target, an inclinometer 205 configured to auxiliary measure an inclination of the monitoring apparatus 111, a high-low driving body 207 configured to drive the monitoring apparatus 111 in a high-low direction, a distance measuring unit 209 aligned with the at least one camera 210 and 203 and configured to measure a distance of the target, a satellite and inertial navigation sensor 211 configured to measure coordinate information and inclination information of the moving object 101, and a turning driving body 213 configured to drive the monitoring apparatus 111 in a turning direction. Here, the inclination information may include information on a heading angle (e.g., a yaw angle), a roll angle, and a pitch angle.

According to embodiments of the present disclosure, the high-low driving body 207 may comprise at least one motor that is configured to actuate at least a portion of the monitoring apparatus 111 (e.g., the at least one camera 201 and 203) to pitch by rotating around a pitch axis.

According to embodiments of the present disclosure, the turning driving body 213 may comprise at least one motor that is configured to actuate at least a portion of the monitoring apparatus 111 (e.g., the at least one camera 201 and 203) to yaw by rotating around a yaw axis.

According to an embodiment of the present disclosure, the at least one camera 201 and 203 may be applied with continuous zoom or step-by-step zoom having a variable FOV of several degrees (°) to several tens of degrees, and the FOV may be manually or automatically adjusted based on the operating apparatus 121. In addition, the inclinometer 205 and the satellite and inertial navigation sensor 211 may measure latitude, longitude, and altitude values, and heading angles, pitching angles, and roll angles of the monitoring apparatus 111.

According to an embodiment of the present disclosure, the monitoring apparatus 111 may determine the inclination accuracy and the inclination with respect to a sensor error by using the inclinometer 205 and the satellite and inertial navigation sensor 211. Also, the monitoring apparatus 111 may be connected to the operating apparatus 121 by wire or wirelessly to share information with the operating apparatus 121. According to an embodiment of the present disclosure, the monitoring apparatus 111 may receive information on a driving angle and an interlocking FOV from the operating apparatus 121. In addition, the monitoring apparatus 111 may be controlled to direct the at least one camera 201 and 203 to a target direction by using the high-low driving body 207 and the turning driving body 213, and may monitor a target.

FIG. 2 illustrates a case in which all components are provided in the monitoring apparatus 111, but the configuration may vary according to embodiments. According to an embodiment of the present disclosure, the inclinometer 205 may not be mounted on the monitoring apparatus 111, and the satellite and inertial navigation sensor 211 may be mounted on the moving object 101, separately from the monitoring apparatus 111.

The operating apparatus 121 generates a control signal for driving the monitoring apparatus 111 and performs a function of generally operating the monitoring system 100. The operating apparatus 121 may be mounted at a remote location outside the moving object 101, may be connected to the monitoring apparatus 111 by wire or wirelessly, and may transmit a signal for controlling the driving of the monitoring apparatus 111. According to an embodiment of the present disclosure, the operating apparatus 121 may include a display and control computer 261 configured to display a status of the monitoring system 100 and generate a control signal, a manipulating apparatus 263 configured to manipulate the operating apparatus 121, and a network apparatus (not shown) configured to communicate and connect to the monitoring apparatus 111.

According to an embodiment of the present disclosure, the operating apparatus 121 may receive monitoring information from the monitoring apparatus 111 via a control computer and obtain target information from the user. Here, the target information may include information on target coordinates and a target shape. Then, the operating apparatus 121 may determine the driving accuracy by using an initial setting of the inclinometer 205, the satellite and inertial navigation sensor 211, or the like, and a measurement error value. According to an embodiment of the present disclosure, the operating apparatus 121 may calculate the driving accuracy by using a measurement error and coordinate transformation of the inclinometer 205, the satellite and inertial navigation sensor 211, or the like. The operating apparatus 121 may determine an interlocking FOV such that an FOV set in the at least one camera 201 and 203 is greater than a driving accuracy range of the monitoring apparatus 111. The operating apparatus 121 may use an artificial intelligence-based automatic detection function to preset a size of an area of a target according to a shape of the target, which may be used to determine an interlocking FOV of a monitoring camera, so that the detection of the target is automatically performed after interlocking target coordinates. Here, the monitoring information may include information on coordinates, inclination, and inclination accuracy of the monitoring apparatus 111, and the driving information may include information on a driving angle and driving accuracy. The driving angle may include information on a turning angle and a high-low angle for driving the monitoring apparatus 111, and the driving accuracy may include information on a turning angle error and a high-low angle error.

Figure 3:
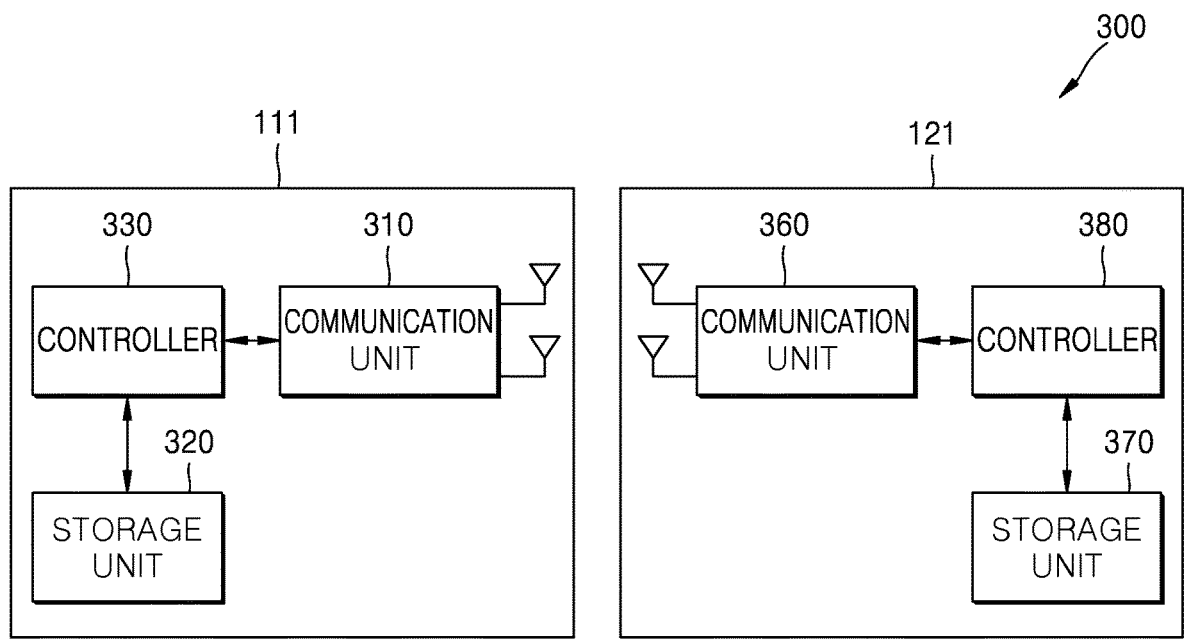
FIG. 3 is a schematic diagram illustrating functions of a monitoring apparatus and an operating apparatus in a monitoring system, according to various embodiments.

FIG. 3 shows a schematic diagram 300 of functions of the monitoring apparatus 111 and the operating apparatus 121 in the monitoring system 100 according to various embodiments. FIG. 3 shows an internal configuration of the monitoring apparatus 111 and the operating apparatus 121.

The monitoring apparatus 111 may include a communication unit 310, a storage unit 320, and a controller 330. The operating apparatus 121 may include a communication unit 360, a storage unit 370, and a controller 380.

The communication unit 310 and the communication unit 360 perform functions of transmitting a receiving signals via wired or wireless channels. The communication unit 310 and the communication unit 360 may be referred to as a transmitter, a receiver, and/or a transceiver. According to embodiments, each of the two communication units 310 and 360 may include any one or any combination of a digital modem, a radio frequency (RF) modem, a WiFi chip, and related software and/or firmware. According to an embodiment of the present disclosure, the communication unit 310 of the monitoring apparatus 111 may transmit monitoring information to the operating apparatus 121, and receive information on a driving angle and an interlocking FOV from the operating apparatus 121.

The storage unit 320 and the storage unit 370 perform a function of storing data such as a basic program, an application program, and setting information for an operation of the monitoring apparatus 111 and the operating apparatus 121, respectively. Each of the storage unit 320 and the storage unit 370 is a non-transitory computer-readable recording medium, and may include random access memory (RAM), read only memory (ROM), and permanent mass storage devices such as disk drives. In addition, the storage unit 320 and the storage unit 370 may provide stored data according to requests of the controller 330 and the controller 380, respectively.

The controller 330 and the controller 380 may control overall operations of the monitoring apparatus 111 and the operating apparatus 121, respectively. For example, the controller 330 and the controller 380 may transmit and receive signals through the communication unit 310 and the communication unit 360, respectively. In addition, the controller 330 and the controller 380 may record data in the storage unit 320 and the storage unit 370. According to various embodiments of the present disclosure, the controller 330 of the monitoring apparatus 111 may control to transmit monitoring information to the operating apparatus 121 and receive a driving angle and an interlocking FOV from the operating apparatus 121. Thereafter, the controller 330 of the monitoring apparatus 111 may adjust a pointing direction of a monitoring camera (e.g., the at least one camera 201 and 203) and determine whether the monitoring apparatus 111 performs re-driving, by using the driving angle and the interlocking FOV. The controller 380 of the operating apparatus 121 may control to receive monitoring information from the monitoring apparatus 111. In addition, the controller 380 of the operating apparatus 121 may calculate a driving angle and an interlocking FOV, based on monitoring information and target information, and transmit the driving angle and the interlocking FOV to the monitoring apparatus 111. According to embodiments, each of the two controller 330 and 380 may include or may be implemented by a processor such as a central processing unit (CPU) that performs the respective functions, a microprocessor, or the like that implements a software module of programs or codes, which contains one or more executable instructions for performing the above-described control functions.

Figure 4:
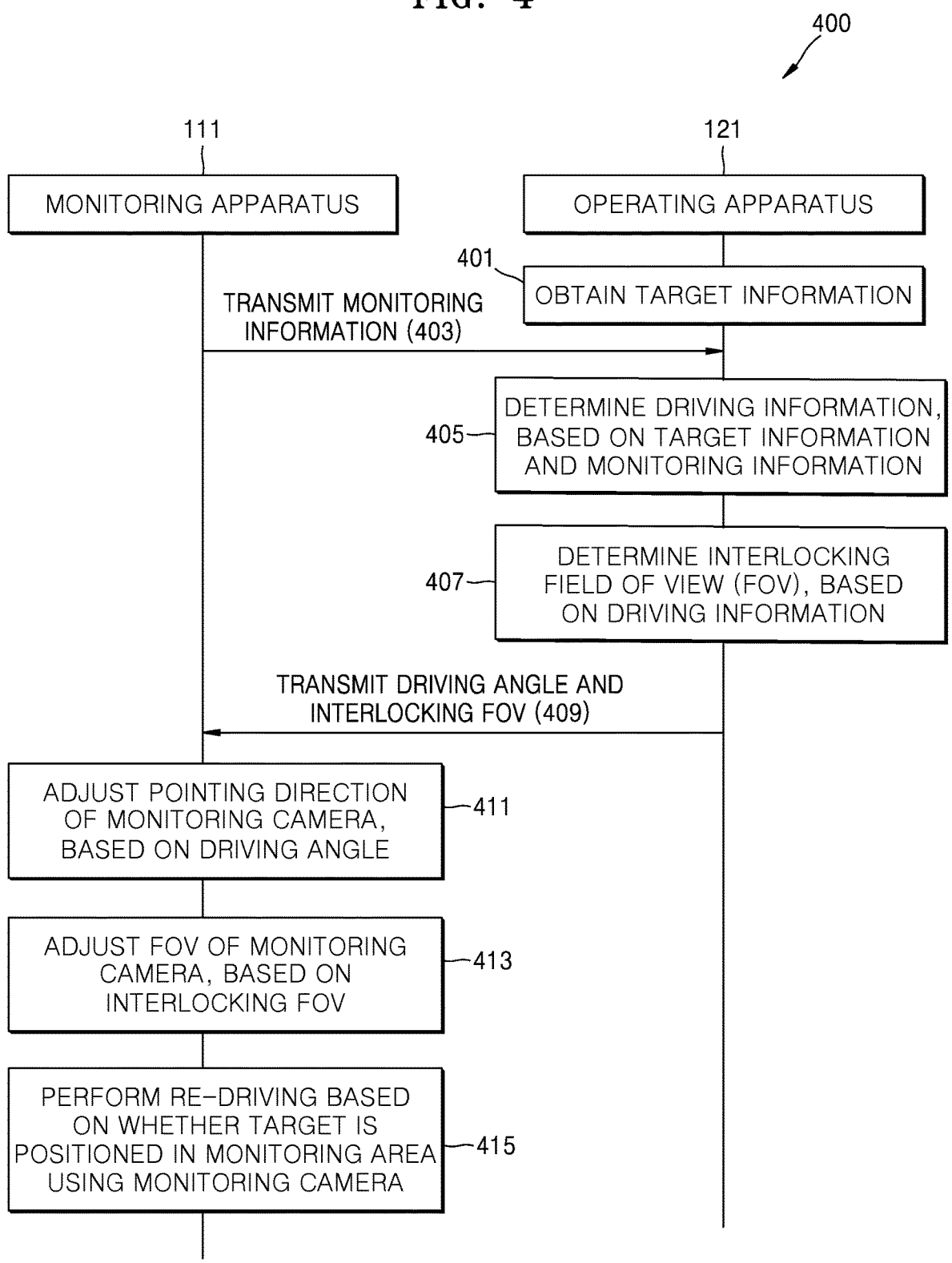
FIG. 4 is a flowchart illustrating an operating method of a monitoring system according various embodiments.

FIG. 4 is a flowchart 400 illustrating an operating method of the monitoring system 100 according various embodiments. Referring to FIG. 4, an operating method of the monitoring apparatus 111 and the operating apparatus 121 of the monitoring system 100 is described.

Referring to FIG. 4, in operation 401, the operating apparatus 121 obtains target information from an outside. The operating apparatus 121 may start target interlocking and obtain target information from the user. Here, the target information may include information on target coordinates and a target shape. According to an embodiment of the present disclosure, the operating apparatus 121 may start coordinate interlocking by a user using the display and control computer 261 or the manipulating apparatus 263, and may receive target information by using a network device or receive target information from the user. According to an embodiment of the present disclosure, target coordinates may include coordinates related to latitude, longitude, and altitude of the target, and the target shape may include a shape of any target of enemy forces such as a person, a vehicle, a tank, an aircraft, an antiaircraft weapon unit, or the like. According to an embodiment of the present disclosure, when the target shape is not specified, a preset horizontal length and target size may be applied.

In operation 403, the monitoring apparatus 111 transmits monitoring information to the operating apparatus 121. The monitoring apparatus 111 may transmit coordinate information of the monitoring apparatus 111, information on coordinates of the monitoring apparatus 111 from the inclinometer 205 and the satellite and inertial navigation sensor 211, information on inclination and inclination accuracy with respect to a monitoring sensor (e.g., the at least one camera 201 and 203) to the operating apparatus 121. According to an embodiment of the present disclosure, the monitoring information may include information on coordinates, inclination, and inclination accuracy of the monitoring apparatus 111. Here, the inclination may include information on a heading angle, a roll angle, and a pitch angle of the monitoring apparatus 111, and the inclination accuracy may include sensor error information.

In operation 405, the operating apparatus 121 determines driving information, based on the target information and the monitoring information. The operating apparatus 121 may calculate a driving angle, a driving accuracy, and a target distance, based on the target information and the monitoring information. The operating apparatus 121 may determine a driving angle for arranging a target to the center of an image by using coordinate transformation from the target information and the monitoring information. According to an embodiment of the present disclosure, the driving angle may include information on a turning angle and a height angle. In addition, the operating apparatus 121 may store an error table corresponding to an inclination in advance, and may determine the driving accuracy by using the inclination accuracy, included in the monitoring information, and the error table. According to an embodiment of the present disclosure, the driving accuracy may include information on a turning error and a height error. In addition, the operating apparatus 121 may determine a distance between the target and the monitoring apparatus 111, based on a distance measured by the distance measuring unit 209 of the monitoring apparatus 111.

In operation 407, the operating apparatus 121 determines an interlocking FOV, based on the driving information. The operating apparatus 121 may determine the interlocking FOV of the monitoring apparatus 111 by using the driving accuracy and the target distance. That is, the operating apparatus 121 may determine an interlocking FOV for adjusting a monitoring area by using a magnification adjustment of the monitoring camera. According to an embodiment of the present disclosure, the interlocking FOV may include a horizontal field of view (HFOV). According to an embodiment of the present disclosure, when a plurality of monitoring cameras are included in the monitoring apparatus 111 and a plurality of camera images are simultaneously output to the operating apparatus 121, an FOV may be adjusted differently for each of the plurality of monitoring cameras.

In operation 409, the operating apparatus 121 transmits the driving angle and the interlocking FOV to the monitoring apparatus 111. The operating apparatus 121 may transmit information related to the turning angle and the height angle of the monitoring apparatus 111 and the interlocking FOV for adjusting the magnification of the monitoring camera to the monitoring apparatus 111.

In operation 411, the monitoring apparatus 111 adjusts a pointing direction of the monitoring camera, based on the driving angle. According to an embodiment of the present disclosure, the monitoring apparatus 111 may rotate a pointing angle of the monitoring camera by using the turning driving body 213 and the high-low driving body 207 to correspond to the turning angle and the height angle. Accordingly, the monitoring camera of the monitoring apparatus 111 may be arranged to point to a target direction.

In operation 413, the monitoring apparatus 111 adjusts an FOV of the monitoring camera, based on the interlocking FOV. According to an embodiment of the present disclosure, the monitoring apparatus 111 may adjust at least one of a zoom magnification and a focus magnification of the monitoring camera to correspond to the interlocking FOV. Accordingly, the HFOV of the monitoring camera may be adjusted to be the same as the interlocking FOV. According to an embodiment of the present disclosure, when the monitoring camera is in the form of a calculated zoom, the zoom and focus magnification may be adjusted to a position of an FOV of a monitoring camera, which is closest to the interlocking FOV of the monitoring apparatus 111.

In operation 415, the monitoring apparatus 111 performs re-driving based on whether the target is positioned in the monitoring area using the monitoring camera. Re-driving may refer to driving that detects a target by adjusting the pointing direction of the monitoring camera. After interlocking the target coordinates, the monitoring apparatus 111 may identify whether a target exists in the monitoring image. According to an embodiment of the present disclosure, the monitoring apparatus 111 may obtain a result determined by the user's eyes or a result obtained by an automatic detection mode of the operating apparatus 121. Thereafter, the monitoring apparatus 111 may end coordinate interlocking when the monitoring apparatus 111 identifies that the target is positioned in the monitoring area. However, when the monitoring apparatus 111 identifies that the target is not positioned in the monitoring area, the monitoring apparatus 111 may perform re-driving. A detailed re-driving method is described in detail with reference to FIG. 5.

Figure 5:
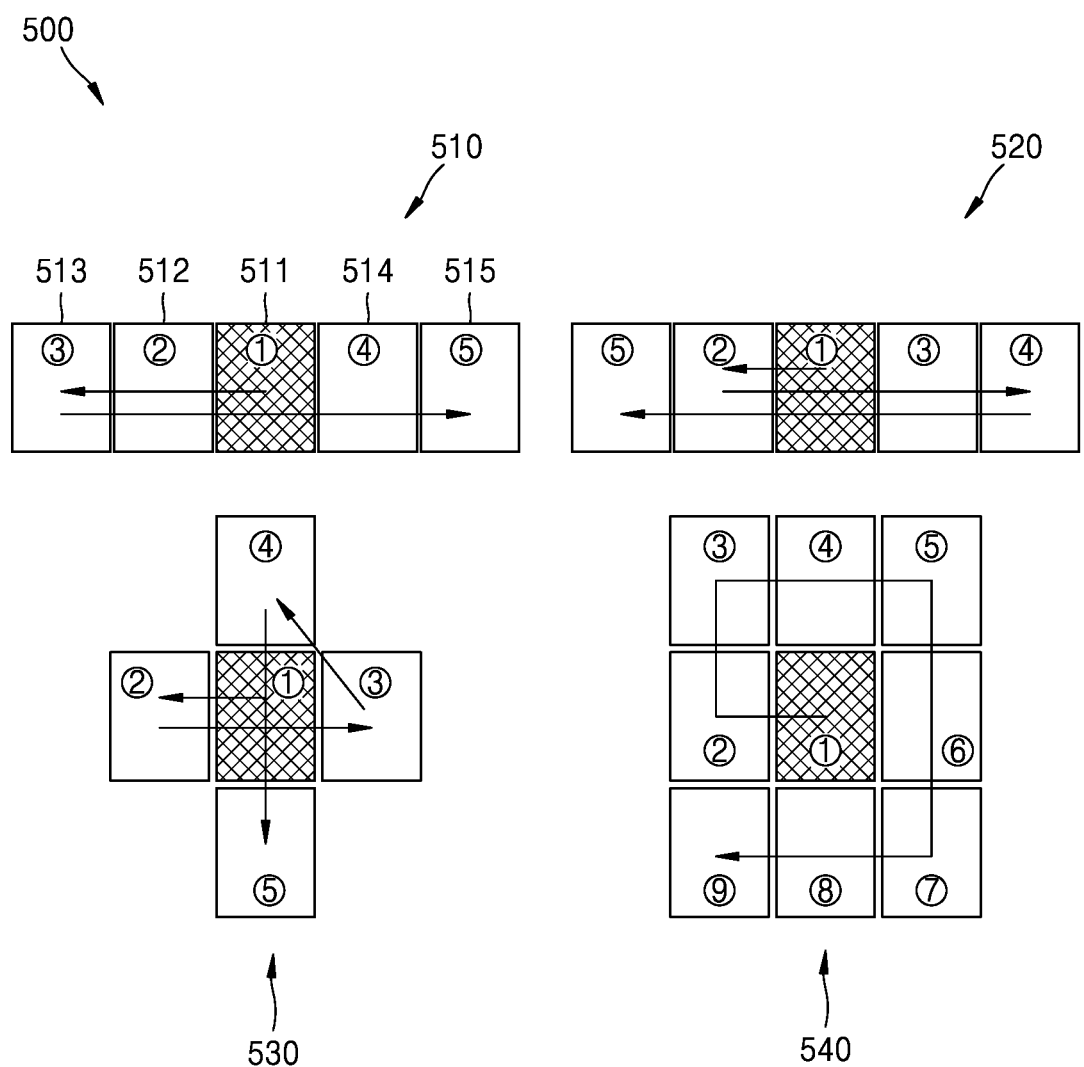
FIG. 5 is a schematic diagram illustrating a re-driving method in a monitoring system according to various embodiments.

FIG. 5 is a schematic diagram 500 illustrating a re-driving method in the monitoring system 100 according to various embodiments. FIG. 5 illustrates a driving pattern related to an operation of the monitoring apparatus 111.

After target coordinates are interlocked, when a target position is changed or the target does not exist in an image area of a monitoring camera from the beginning due to a driving error, the monitoring apparatus 111 may perform re-driving. According to an embodiment of the present disclosure, the monitoring apparatus 111 may adjust a pointing direction of the monitoring camera according to a preset driving pattern. Referring to a first driving pattern 510, a first area 511 refers to a monitoring area of the monitoring camera according to a current driving angle and an interlocked FOV. When the monitoring apparatus 111 identifies that the target does not exist in the first area 511, the monitoring apparatus 111 changes the pointing direction of the monitoring camera to a second area 512 according to the first driving pattern 510. When the monitoring apparatus 111 identifies that the target also does not exist in the second area 512, the monitoring apparatus 111 may sequentially change the pointing direction of the monitoring camera to third to fifth areas 513 to 515. In the same way, referring to second to fourth driving patterns 520, 530, and 540, shaded portions refer to monitoring areas according to a current driving angle and an interlocking FOV, and the pointing direction of the monitoring camera may be changed in an order shown in each of driving patterns. The monitoring camera may search for a target through an operation of changing the pointing direction of the monitoring camera. Although not shown in FIG. 5, when the target is not positioned in a monitoring image, and the monitoring apparatus 111 performs re-driving, the HFOV of the monitoring camera may be enlarged by a present size. The target may also be searched through an operation of changing the pointing direction of the monitoring camera by using an enlarged monitoring area thereafter.

After the target coordinates are interlocked, when the target abruptly exits in an area of an image of the monitoring camera after the target is positioned in the image of the monitoring camera, the monitoring apparatus 111 may perform re-driving. According to an embodiment of the present disclosure, the monitoring apparatus 111 may track the target by checking a moving speed and a moving direction of the target. That is, in a situation in which the target is positioned in an image, the monitoring apparatus 111 may check a first target position in the monitoring area at a first time and a second target position in a monitoring image at a second time. Thereafter, the monitoring apparatus 111 may determine a speed of the target in the monitoring image by using a time interval between the first time and the second time, the first target position, and the second target position. Thereafter, the monitoring apparatus 111 may predict a target position on the basis of the speed of the target, and adjust the pointing direction of the monitoring camera in the predicted direction.

Figure 6:
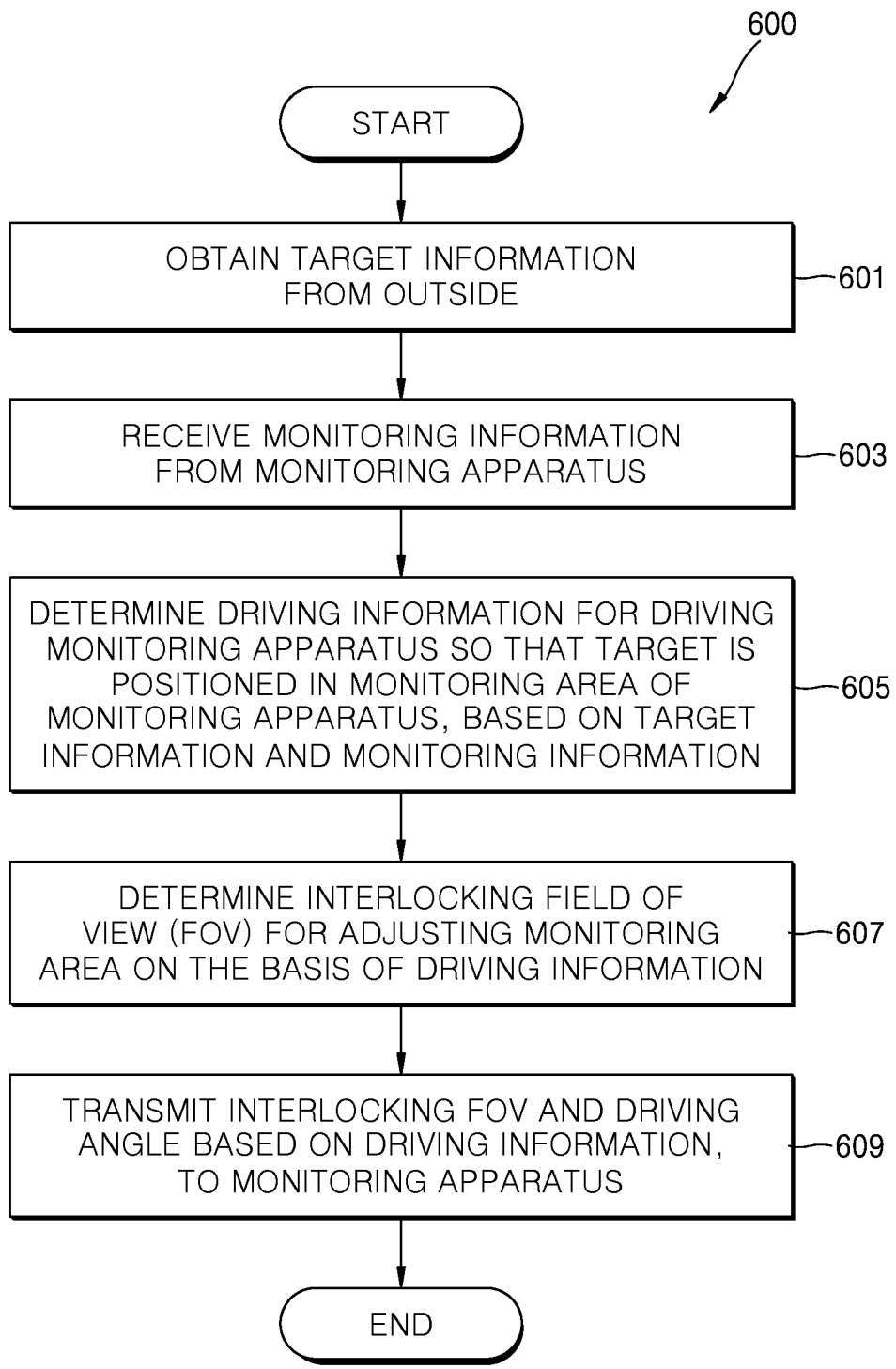
FIG. 6 is a flowchart illustrating an operating method of an operating apparatus in a monitoring system according to various embodiments.

FIG. 6 is a flowchart 600 illustrating an operating method of the operating apparatus 121 in the monitoring system 100 according to various embodiments. FIG. 6 illustrates an operating method of the operating apparatus 121 in the monitoring system 100, wherein the monitoring system 100 includes the monitoring apparatus 111 mounted on a moving object and configured to detect a target, and the monitoring system 100 further includes the operating apparatus 121 configured to operate the monitoring apparatus 111.

Referring to FIG. 6, in operation 601, the operating apparatus 121 obtains target information from an outside. The operating apparatus 121 may start coordinate interlocking and receive the target information or receive the target information input by a user. According to an embodiment of the present disclosure, the target information may include target coordinates and a target shape. The target coordinates may include coordinates relating to latitude, longitude, and altitude of the target, and the target shape may include a shape of a target of enemy forces such as a person, a vehicle, a tank, an aircraft, an anti-aircraft weapon unit, or the like.

In operation 603, the operating apparatus 121 receives monitoring information from the monitoring apparatus 111. The operating apparatus 121 may receive, from the monitoring apparatus 111, information on coordinates of the monitoring apparatus 111, and an inclination and inclination accuracy with respect to a monitoring sensor.

According to an embodiment of the present disclosure, the monitoring information includes coordinates, inclination, and inclination accuracy of the monitoring apparatus 111, the inclination may include at least one of a heading angle, a roll angle, and a pitch angle, and the inclination accuracy may include a sensor error of the monitoring apparatus 111.

In operation 605, the operating apparatus 121 determines driving information for driving the monitoring apparatus 111 so that the target is positioned in the monitoring area of the monitoring apparatus 111, based on the target information and the monitoring information. The operating apparatus 121 may calculate a driving angle, a driving accuracy, and a target distance, based on the target information and the monitoring information. The operating apparatus 121 may determine a driving angle for arranging a target to the center of an image by using coordinate transformation from the target information and the monitoring information. In addition, the operating apparatus 121 may determine the driving accuracy by using an error table corresponding to the inclination and the inclination accuracy. Also, the operating apparatus 121 may determine a distance between the target and the monitoring apparatus 111.

According to an embodiment of the present disclosure, the driving information may include a driving angle, a driving accuracy, and a target distance, wherein the driving angle may include information on a turning angle and a height angle related to the driving of the monitoring apparatus 111. The driving accuracy may include a turning error, with respect to the turning angle, and a height error, with respect to the height angle. The target distance may include a distance between the target and the monitoring apparatus 111.

In operation 607, the operating apparatus 121 determines an interlocking FOV for adjusting the monitoring area on the basis of the driving information. According to an embodiment of the present disclosure, the operating apparatus 121 may determine an interlocking FOV for adjusting the monitoring area by using a magnification adjustment of the monitoring camera, based on the driving accuracy and the target distance. A method of determining a particular interlocking FOV is described in detail below with reference to FIG. 7.

In operation 609, the operating apparatus 121 transmits the interlocking FOV and the driving angle based on the driving information to the monitoring apparatus 111. The operating apparatus 121 may transmit the driving angle included in the driving information determined in operation 605 and the interlocking FOV determined in operation 607 to the monitoring apparatus 111. The monitoring apparatus 111 may control the driving of the monitoring camera to correspond the received driving angle and the interlocking FOV.

Figure 7:
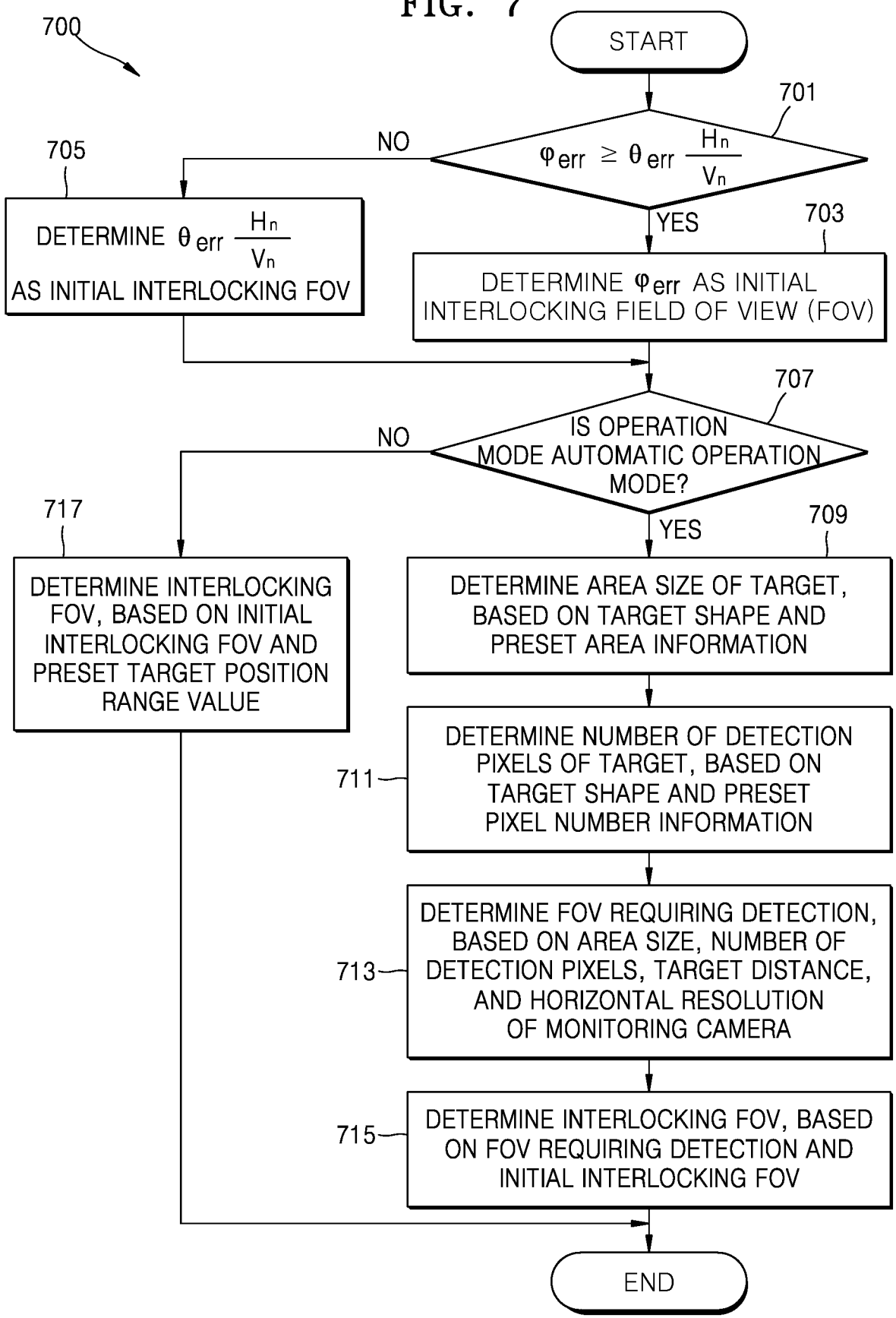
FIG. 7 is a flowchart illustrating a method in which an operating apparatus determines an interlocking field of view (FOV) in a monitoring system according to various embodiments.

FIG. 7 is a flowchart 700 illustrating a method in which the operating apparatus 121 determines an interlocking FOV in the monitoring system 100 according to various embodiments. FIG. 7 illustrates a method of determining an interlocking FOV of operation 607 in FIG. 6.

The operating apparatus 121 may determine an initial interlocking FOV on the basis of a turning error and a height error of driving accuracy, and may determine an interlocking FOV from the initial interlocking FOV, based on an operation mode of the operating apparatus 121. Here, the operation mode may indicate one of an automatic detection mode and a general detection mode.

Referring to FIG. 7, in operation 701, the operating apparatus 121 compares a turning error with a height error. A comparison between a turning error and a height error may be determined based on Equation 1, below.

$$\rho_{err} \geq \theta_{err} \frac{H_n}{V_n} \qquad \text{[Equation 1]}$$

Referring to Equation 1, $\lambda_{err}$ refers to a turning error, $\theta_{err}$ refers to a height error, $H_n$ refers to a horizontal resolution of a monitoring camera, and $V_n$ refers to a vertical resolution of the monitoring camera. The operating apparatus 121 may identify whether the turning error is greater than or equal to a mathematical combination of the height error and a ratio of the horizontal resolution to the vertical resolution of the monitoring apparatus 111.

According to an embodiment of the present disclosure, when the turning error is greater than or equal to the mathematical combination of the height error and the ratio of the horizontal resolution to the vertical resolution of the monitoring apparatus 111, the operating apparatus 121 may proceed to operation 703 to determine the turning error as an initial interlocking FOV HFOV$_{initial}$. According to another embodiment of the present disclosure, when the turning error is less than the ratio of the horizontal resolution to the vertical resolution of the monitoring apparatus 111 is considered, the operating apparatus 121 may proceed to operation 705 and determine the mathematical combination of the height error and the ratio of the horizontal resolution to the vertical resolution of the monitoring apparatus 111 as an initial interlocking FOV HFOV$_{initial}$. According to an embodiment of the present disclosure, because a driving accuracy may be caused by an error in a positive (+) direction or a negative (−) direction, a height error in which a direction of the height error is considered may be reflected to be twice an error value.

In operation 707, the operating apparatus 121 may identify whether an operation mode thereof is an automatic detection mode. According to an embodiment of the present disclosure, the automatic detection mode may include a mode that determines an interlocking FOV on the basis of a required FOV according to a target shape, and the general detection mode may include a mode that determines an interlocking FOV, based on a preset target position range value.

According to an embodiment of the present disclosure, when the operation mode of the operating apparatus 121 is the automatic detection mode, the operating apparatus 121 proceeds to operation 709 and determines an area size of a target, based on the target shape and preset area information. According to an embodiment of the present disclosure, when the operating apparatus 121 identifies that the operation mode of the operating apparatus 121 is not the automatic detection mode, the operating apparatus 121 may proceed to operation 717 and determine the interlocking FOV on the basis of the initial interlocking FOV and the preset target position range value.

In operation 709, the operating apparatus 121 determines the area size of the target based on the target shape and the preset area information. The operating apparatus 121 may determine an area size $S_t$ of the target by using the target information received from the monitoring apparatus 111 and the size for each shape type stored in advance. According to an embodiment of the present disclosure, the operating apparatus 121 may identify the target as a human shape and determine the area size of the target in an image by using a pre-stored size of the human shape.

In operation 711, the operating apparatus 121 determines a number of detection pixels, based on the target shape and preset pixel number information. The operating apparatus 121 may determine the number of detection pixels of the target by using the target shape and the pre-stored number of pixels for each pixel shape. According to an embodiment of the present disclosure, the operating apparatus 121 may identify the target as a human shape and check a number $P_t$ of target pixels corresponding to the human shape.

In operation 713, the operating apparatus 121 determines a Required FOV for detection on the basis of the area size, the number of detection pixels, the target distance, and the horizontal resolution of the monitoring camera. The operating apparatus 121 may calculate the Required FOV for detection for automatic detection by using the area size determined in operation 709 and the number of detection pixels determined in operation 711. The required FOV for detection may be determined based on Equation 2, below.

$$HFOV2 = \frac{2 \times \tan^{-1}(S_t \div 2x) \times H_n}{P_t} \quad \text{[Equation 2]}$$

Referring to Equation 2, HFOV2 refers to a required FOV for detection, $S_t$ refers to an area size, $P_t$ refers to a number of detection pixels, x refers to a target distance, and $H_n$ refers to a horizontal resolution.

In operation 715, the operating apparatus 121 determines the interlocking FOV, based on the required FOV for detection HFOV2 and the initial interlocking FOV $HFOV_{initial}$. The operating apparatus 121 may determine a final interlocking FOV by comparing the required FOV for detection HFOV2 with the initial interlocking FOV $HFOV_{initial}$. According to an embodiment of the present disclosure, when the required FOV for detection HFOV2 is greater than or equal to the initial interlocking FOV $HFOV_{initial}$, the operating apparatus 121 may determine the required FOV for detection HFOV2 as the interlocking FOV. According to an embodiment of the present disclosure, when the required FOV for detection HFOV2 is less than the initial interlocking FOV $HFOV_{initial}$, the operating apparatus 121 may determine the initial interlocking FOV $HFOV_{initial}$ as the interlocking FOV. Thereafter, when a target is detected in a monitoring image in the automatic detection mode, the monitoring apparatus may be re-driven so that the target is positioned in the center of the monitoring image.

In operation 717, the operating apparatus 121 determines the interlocking FOV, based on the initial interlocking FOV $HFOV_{initial}$ and the preset target position range value. When the operating apparatus 121 identifies that the operation mode thereof is not the automatic detection mode, the operating apparatus 121 identifies the operation mode thereof as the general operation mode. In particular, the operating apparatus 121 may determine the interlocking FOV, based on the target position range value.

According to an embodiment of the present disclosure, the operating apparatus 121 may determine an area in which the target is to be positioned within the monitoring image. Thereafter, the operating apparatus 121 may position the target in the area corresponding to the target position range value within the monitoring image. In the general detection mode, the interlocking FOV may be determined as in Equation 3, below.

$$HFOV = \frac{HFOV_{initial}}{k} \quad \text{[Equation 3]}$$

Referring to Equation 3, HFOV refers to an interlocking FOV, $HFOV_{initial}$ refers to an initial interlocking FOV, and k refers to a target position range value.

According to an embodiment of the present disclosure, the operating apparatus 121 may determine an area in which the target is located within the monitoring image (e.g., a central area of the monitoring image), and the target position range value k may have a value of 0.05. At this time, the operating apparatus 121 may determine a target range so that the area in which the target is located does not exceed 5% of an entire image area in an entire monitoring image.

Figure 8:
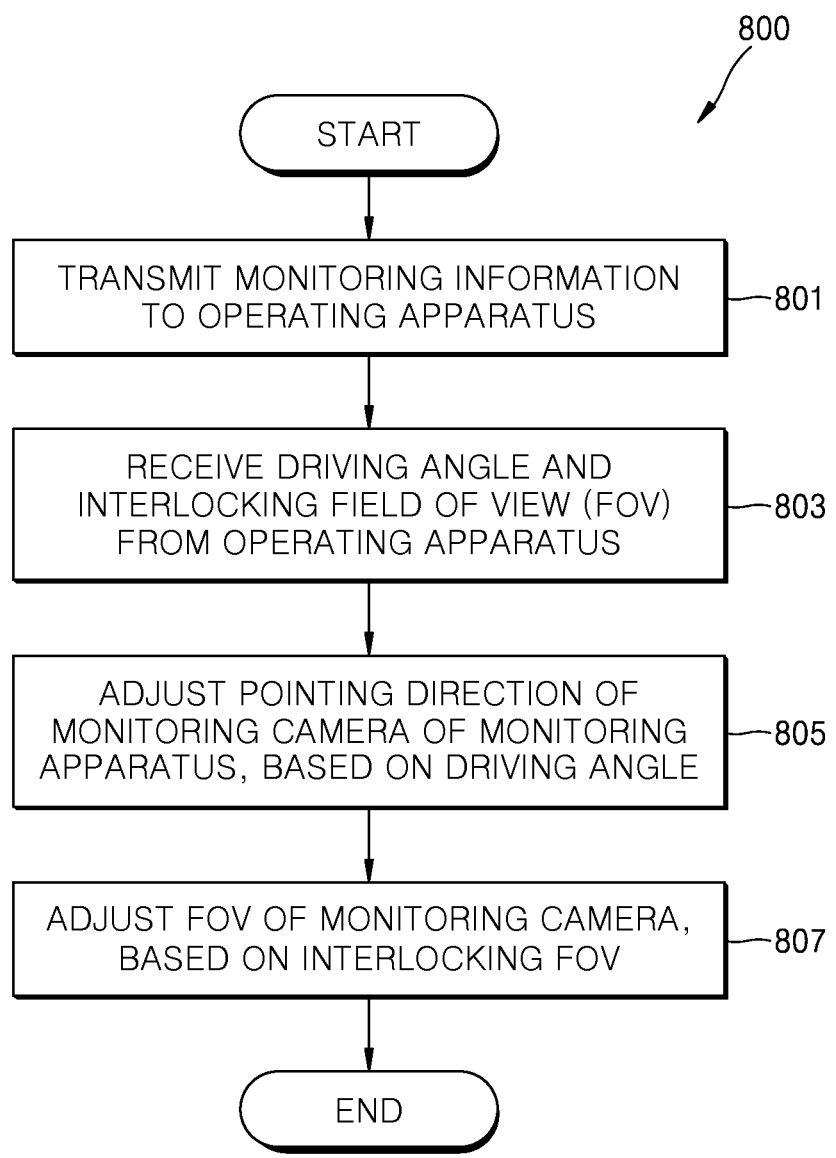
FIG. 8 is a flowchart illustrating an operating method of a monitoring apparatus in a monitoring system according to various embodiments.

FIG. 8 is a flowchart 800 illustrating an operating method of the monitoring apparatus 111 in the monitoring system 100 according to various embodiments.

Referring to FIG. 8, in operation 801, the monitoring apparatus 111 transmits monitoring information to the operating apparatus 121. The monitoring apparatus 111 may transmit coordinate information of the monitoring apparatus 111, information on coordinates of the monitoring apparatus 111 from the inclinometer 205, and the satellite and inertial navigation sensor 211, information on inclination and inclination accuracy with respect to a monitoring sensor to the operating apparatus 121.

In operation 803, the monitoring apparatus 111 receives a driving angle and an interlocking FOV from the operating apparatus 121. According to an embodiment of the present disclosure, the monitoring apparatus 111 may receive, from the operating apparatus 121, driving information related to a turning angle and a height angle and the interlocking FOV for adjusting the magnification of a monitoring camera.

According to an embodiment of the present disclosure, the driving angle may include information for driving the monitoring apparatus 111 to position a target in a monitoring area of the monitoring apparatus 111, and the interlocking FOV may include an FOV for adjusting the monitoring area.

In operation 805, the monitoring apparatus 111 adjusts a pointing direction of the monitoring camera on the basis of the driving angle. The monitoring apparatus 111 may rotate an angle of the monitoring apparatus 111 by using a turning driving body and a height driving body to correspond to the turning angle and the height angle.

In operation 807, the monitoring apparatus 111 adjusts an FOV of the monitoring camera on the basis of the interlocking FOV. According to an embodiment of the present disclosure, the monitoring apparatus 111 may adjust at least one of a zoom magnification and a focus magnification of the monitoring camera to correspond to the interlocking FOV. Thereafter, the monitoring apparatus 111 may identify whether the target is positioned in the monitoring area of the monitoring image using the monitoring camera, and perform re-driving for tracking the target when the monitoring apparatus 111 determines that the target is not positioned in the monitoring area.

Figure 9:
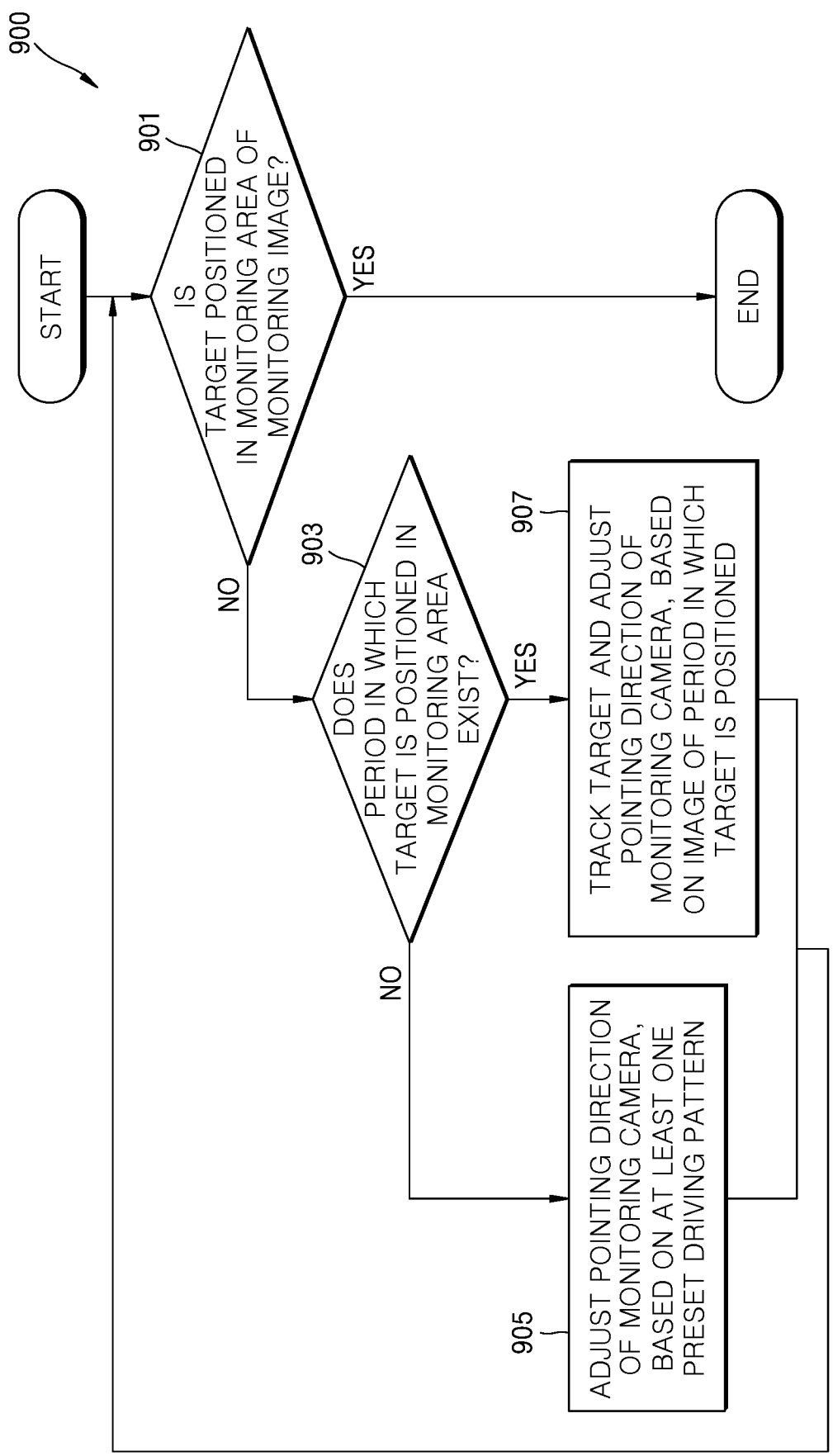
FIG. 9 is a flowchart illustrating a method in which a monitoring apparatus performs re-driving in a monitoring system according to various embodiments.

FIG. 9 is a flowchart 900 illustrating a method in which the monitoring apparatus 111 performs re-driving in the monitoring system 100 according to various embodiments.

Referring to FIG. 9, in operation 901, the monitoring apparatus 111 identifies whether a target is positioned in a monitoring area of a monitoring image using a monitoring camera. The monitoring apparatus 111 identifies whether the target is positioned in an image captured by the monitoring camera after adjusting a pointing direction of the monitoring camera on the basis of the received driving angle and an interlocking FOV.

According to an embodiment of the present disclosure, the monitoring apparatus 111 may obtain a determination result of a user or the operating apparatus 121 regarding whether a time period in which the target is positioned in the monitoring area exists. Thereafter, the monitoring apparatus 111 may end coordinate interlocking when the monitoring apparatus 111 identifies that there is a time period in which the target is positioned in the monitoring area. According to another embodiment of the present disclosure, when the monitoring apparatus 111 determines that the target is not positioned in the monitoring area, the monitoring apparatus 111 may perform an operation of tracking the target.

In operation 903, the monitoring apparatus 111 identifies whether there is a time period in which the target is positioned in the monitoring area. After the target coordinates are interlocked, a target positioned may be changed or the target may not exist in an image of the monitoring camera from the beginning due to a driving error. In addition, the target may abruptly exit an image of the monitoring camera after the target is positioned in an area of an image of the monitoring camera. The monitoring apparatus 111 may perform re-driving differently depending on whether there is a time period in which the target is positioned in the area of the image of the monitoring camera. According to an embodiment of the present disclosure, when there is no time period in which the target is positioned in the monitoring area, the monitoring apparatus 111 may proceed to operation 905 and adjust the pointing direction of the monitoring camera on the basis of at least one preset driving pattern.

According to another embodiment of the present disclosure, when there is a time period in which the target is positioned in the monitoring area, the monitoring apparatus 111 may proceed to operation 907 to track the target on the basis of an image of the time period in which the target is positioned, and adjust the pointing direction of the monitoring camera. The monitoring apparatus 111 may determine a first target position in a monitoring area at a first time, determine a second target position in the monitoring area at a second time after the first time, predict a position of the target on the basis of the first target position, the second target position, and a time interval between the first time and the second time, and adjust the pointing direction of the monitoring camera to a predicted target direction.

Methods according to the embodiments described in the present disclosure may be implemented in a form of hardware, software, or a combination of hardware and software.

When implemented in software, a computer-readable storage medium storing one or more programs (software modules) may be provided. The one or more programs stored in the computer-readable storage medium are configured to be executable by one or more processors in an electronic device. The one or more programs include instructions for causing an electronic device to execute methods according to embodiments described in the present disclosure.

Such programs (software modules, software) may be stored in random access memory, non-volatile memory including flash memory, read only memory (ROM), electrically erasable programmable ROM (EEPROM), a magnetic disc storage device, compact disc-ROM (CD-ROM), digital versatile discs (DVDs), another type of optical storage device, and a magnetic cassette. Alternatively, the programs may be stored in a memory composed of a combination of some or all of the above-stated memories. In addition, each configuration memory may be included in plurality.

In addition, the programs may be stored in an attachable storage device which may be accessed through a communication thereof such as the Internet, intranet, local area network (LAN), wide area network (WAN), or storage area network (SAN), or a combination thereof. Such a storage device may be connected to an apparatus implementing an embodiment of the present disclosure through an external port. In addition, a separate storage device on a communication network may be also connected to an apparatus implementing an embodiment of the present disclosure.

In particular embodiments of the present disclosure described above, components included in the disclosure are expressed in the singular or plural according to particular embodiments presented. However, the singular or plural expression is appropriately selected for the context presented for convenience of description, and embodiments of the present disclosure are not limited to the singular or plural component, and even when a component is expressed in plural, it may be composed of a singular, or even if a component is expressed in a singular, it may be composed of a plurality.

An apparatus and method according to various embodiments of the present disclosure may automatically detect a target by interlocking a monitoring area of a monitoring apparatus and a position of the target.

In addition, the apparatus and method according to various embodiments of the present disclosure allow an operating apparatus to accurately determine a driving angle and an interlocking FOV of a monitoring apparatus by considering measurement errors in a measurement system.

In addition, the apparatus and method according to various embodiments of the present disclosure enable the monitoring apparatus to automatically track and monitor a target by performing re-driving when the monitoring area and the position of the target are not interlocked in the monitoring system.

Effects that may be obtained in embodiments of the present disclosure are not limited to the above-mentioned effects, and other effects not mentioned may be clearly understood by those of ordinary skill in the art to which the present disclosure belongs.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the present disclosure.

What is claimed is:

1. An operating apparatus configured to control a monitoring apparatus that is mounted on a moving object, the monitoring apparatus including a monitoring camera and configured to a detect a target, the operating apparatus comprising:
a controller, wherein the controller is configured to:
obtain target information from an outside;
receive monitoring information from the monitoring apparatus;
determine, based on the target information and the monitoring information, driving information for driving the monitoring apparatus so that the target is positioned in a monitoring area of a monitoring image of the monitoring camera of the monitoring apparatus;
determine, based on the driving information, an interlocking field of view (FOV) for adjusting the monitoring area; and
transmit the interlocking FOV and a driving angle, based on the driving information, to the monitoring apparatus.

2. The operating apparatus of claim 1, wherein the target information comprises target coordinates and a target shape,
wherein the monitoring information comprises coordinates, inclination, and inclination accuracy of the monitoring apparatus,
wherein the inclination comprises at least one from among a heading angle, a roll angle, and a pitch angle, and
wherein the inclination accuracy comprises a sensor error of the monitoring camera of the monitoring apparatus.

3. The operating apparatus of claim 2, wherein the driving information comprises the driving angle, a driving accuracy, and a target distance,
wherein the driving angle comprises information on a turning angle and a height angle related to driving of the monitoring apparatus,
wherein the driving accuracy comprises a turning error with respect to the turning angle, and a height error with respect to the height angle, and
wherein the target distance comprises a distance between the target and the monitoring apparatus.

4. The operating apparatus of claim 3, wherein the controller is further configured to:
determine the driving accuracy, based on the inclination accuracy and a preset error table, and
determine the interlocking FOV, based on the driving accuracy and the target distance.

5. The operating apparatus of claim 4, wherein the controller is further configured to:
determine an initial interlocking FOV, based on the turning error and the height error, and
determine the interlocking FOV from the initial interlocking FOV, based on an operation mode of the operating apparatus being a first detection mode or a second detection mode,
wherein the first detection mode comprises a mode in which the interlocking FOV is determined based on a required FOV for detection according to the target shape, and wherein the second detection mode comprises a mode in which the interlocking FOV is determined based on a preset target position range value.

6. The operating apparatus of claim 5, wherein the controller is further configured to:
identify whether the turning error is greater than or equal to a mathematical combination of the height error and a ratio of a horizontal resolution to a vertical resolution of the monitoring apparatus,
determine the turning error as the initial interlocking FOV based on the turning error being greater than or equal to the mathematical combination of the height error and the ratio, and
determine the mathematical combination of the height error and the ratio as the initial interlocking FOV, based on the turning error being less than the mathematical combination of the height error and the ratio.

7. The operating apparatus of claim 5, wherein the controller is further configured to:
based on the operation mode being the first detection mode, determine an area size of the target, based on the target shape and preset area information,
determine a number of detection pixels of the target, based on the target shape and preset pixel number information,
determine the required FOV for detection, based on the area size, the number of detection pixels, the target distance, and a horizontal resolution of the monitoring camera of the monitoring apparatus, and
determine the interlocking FOV, based on the required FOV for detection and the initial interlocking FOV.

8. A monitoring apparatus mounted on a moving object and configured to detect a target, the monitoring apparatus comprising:
a monitoring camera; and
a controller, wherein the controller is configured to:
transmit monitoring information to an operating apparatus that comprises a controller,
receive a driving angle and an interlocking field of view (FOV) from the operating apparatus,
adjust a pointing direction of the monitoring camera, based on the driving angle, and
adjust an FOV of the monitoring camera, based on the interlocking FOV,
wherein the driving angle comprises information for driving the monitoring apparatus so that the target is positioned in a monitoring area of a monitoring image of the monitoring camera, and
wherein the interlocking FOV comprises an FOV for adjusting the monitoring area.

9. The monitoring apparatus of claim 8, wherein the controller is further configured to:
identify whether the target is positioned in the monitoring area of the monitoring image, and
perform re-driving to track the target based on the controller identifying that the target is not positioned in the monitoring area, the re-driving comprising re-adjusting the pointing direction of the monitoring camera.

10. The monitoring apparatus of claim 9, wherein the controller is further configured to, based on determining that there is no time period in which the target is positioned in the monitoring area, adjust the pointing direction of the monitoring camera based on at least one preset driving pattern.

11. The monitoring apparatus of claim 9, wherein the controller is further configured to, based on determining that there is a time period in which the target is positioned in the monitoring area:

determine a first target position of the target in the monitoring area at a first time, determine a second target position of the target in the monitoring area at a second time after the first time, predict a position of the target based on the first target position, the second target position, and a time interval between the first time and the second time, and adjust the pointing direction of the monitoring camera to a predicted target direction.

12. A monitoring system comprising:

an operating apparatus comprising a controller; and a monitoring apparatus comprising a controller and a monitoring camera, wherein the operating apparatus is configured to:
obtain target information from an outside;
receive monitoring information from the monitoring apparatus;
determine, based on the target information and the monitoring information, driving information for driving the monitoring apparatus so that a target is positioned in a monitoring area of a monitoring image of the monitoring camera;
determine, based on the driving information, an interlocking field of view (FOV) for adjusting the monitoring area; and
transmit the interlocking FOV and a driving angle, based on the driving information, to the monitoring apparatus, and wherein the monitoring apparatus is configured to:
transmit the monitoring information to the operating apparatus,
receive the driving angle and the interlocking FOV from the operating apparatus;
adjust, based on the driving angle, a pointing direction of the monitoring camera of the monitoring apparatus; and
adjust, based on the interlocking FOV, an FOV of the monitoring camera.

13. A method performed by at least one controller of a monitoring system, the at least one controller including at least one processor, the method comprising:

obtaining target information;

obtaining monitoring information;

determining, based on the target information and the monitoring information, driving information for driving a monitoring apparatus of the monitoring system so that a target is positioned in a monitoring area of a monitoring image of a monitoring camera of the monitoring apparatus;

determining, based on the driving information, an interlocking field of view (FOV) for adjusting the monitoring area;

obtaining a driving angle based on the driving information;

adjusting, based on the driving angle, a pointing direction of the monitoring camera of the monitoring apparatus; and adjusting, based on the interlocking FOV, an FOV of the monitoring camera.

14. The method of claim 13, wherein the target information comprises target coordinates and a target shape, wherein the monitoring information comprises coordinates, inclination, and inclination accuracy of the monitoring apparatus, wherein the inclination comprises at least one from among a heading angle, a roll angle, and a pitch angle, and wherein the inclination accuracy comprises a sensor error of the monitoring camera of the monitoring apparatus.

15. The method of claim 13, wherein the driving information comprises the driving angle, a driving accuracy, and a target distance, wherein the driving angle comprises information on a turning angle and a height angle related to driving of the monitoring apparatus, wherein the driving accuracy comprises a turning error with respect to the turning angle, and a height error with respect to the height angle, and wherein the target distance comprises a distance between the target and the monitoring apparatus.

16. The method of claim 15, further comprising:

determining the driving accuracy, based on an inclination accuracy, included in the monitoring information, and a preset error table, and determining the interlocking FOV, based on the driving accuracy and the target distance.

17. The method of claim 16, further comprising:

determining an initial interlocking FOV based on the turning error and the height error, and determining the interlocking FOV based on the initial interlocking FOV.

18. The method of claim 17, wherein the determining the interlocking FOV comprises:

determining a required FOV for detection based on a target shape included in the target information; and determining the interlocking FOV based on the required FOV for detection and the initial interlocking FOV.

19. The method of claim 17, wherein the determining the interlocking FOV comprises determining the interlocking FOV based on the initial interlocking FOV and a preset target position range value.

20. The method of claim 13, further comprising:

identifying whether the target is positioned in the monitoring area of the monitoring image, and performing re-driving to track the target based on identifying that the target is not positioned in the monitoring area, the performing the re-driving comprising re-adjusting the pointing direction of the monitoring camera.

* * * * *